(12) United States Patent
Chen et al.

(10) Patent No.: US 8,780,290 B2
(45) Date of Patent: Jul. 15, 2014

(54) LIQUID DISPLAYING DEVICE

(75) Inventors: Shih Hsiang Chen, Guandong (CN);
Chengwen Que, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 34 days.

(21) Appl. No.: 13/574,609

(22) PCT Filed: Apr. 18, 2012

(86) PCT No.: PCT/CN2012/074236
§ 371 (c)(1),
(2), (4) Date: Jul. 22, 2012

(87) PCT Pub. No.: WO2013/155676
PCT Pub. Date: Oct. 24, 2013

(65) Prior Publication Data
US 2013/0271699 A1    Oct. 17, 2013

(51) Int. Cl.
*G02F 1/1333*    (2006.01)
(52) U.S. Cl.
USPC ............... 349/58; 349/65; 362/631; 362/632

(58) Field of Classification Search
None
See application file for complete search history.

(56) References Cited

U.S. PATENT DOCUMENTS

2012/0050635 A1*    3/2012    Yoo et al. ............... 349/58

* cited by examiner

*Primary Examiner* — Richard Kim
(74) *Attorney, Agent, or Firm* — Andrew C. Cheng

(57) ABSTRACT

The present invention provides a liquid crystal display device which includes a waveguide, a liquid crystal display panel, a backframe, a middle frame, a printed circuit board, a light source and a deflector. The backframe includes a base plate which is arranged adjacent to a bottom surface of the waveguide and sidewall arranged adjacent to the light inlet surface of the waveguide. The base plate is defined with an opening. The middle frame includes a supporting portion and positioning portion which defines a receiving space with the backframe. The receiving space is corresponding to the through the opening. The printed circuit board is arranged on the outside of the base plate. A deflector is arranged within the receiving space. The base plate is defined with an opening, the light source can be mounted onto the printed circuit board close to the base plate through the opening. Accordingly, a compact, slim design of a liquid crystal display device is achieved with reduced cost.

16 Claims, 2 Drawing Sheets

LIQUID DISPLAYING DEVICE

FIELD OF THE INVENTION

The present invention relates to a technology field of liquid crystal display, and more particularly to a liquid crystal display device.

BACKGROUND OF INVENTION

With the advanced development of the video and visual technology, the liquid crystal display has been widely used and applied to mobile phone, personal computers, television, and all kinds of electronic devices. Since the liquid crystal itself can not emit the light, as a result, an additional light source is needed to be disposed within the liquid crystal display module so as to project necessary light to the liquid crystal thereby facilitating the purpose of the display.

FIG. 1 discloses a prior art liquid crystal display (LCD) device in cross sectional view. The LCD device includes a LCD panel 101, a waveguide 102, an LED module 103, a heat dissipating bracket 104, a backframe 105, a middle frame 106, and a printed circuit board 107. The waveguide 102 is arranged adjacent to the LCD panel 101 with its light emitting surface facing to the LCD panel 101. The LED module 103 includes an LED light tube 1031, and a driving circuit 1032 which is installed on the heat dissipating bracket 104, and in turn, the LED light tube 1031 is disposed on the driving circuit 1032, and located adjacent to the light inlet surface of the waveguide 102. The heat dissipating bracket 103 is attached to the backframe 105. The middle frame 106 is used to secure the backframe 105 and the heat dissipating bracket 104. The LED module 103 is interconnected to the printed circuit board 107 via conductive wires (not shown in this Figure).

The prior art LED device has the following disadvantages. Firstly, the heat dissipating bracket 104 has a certain thickness. As a result, the additional thickness of the heat dissipating bracket 104 will be detrimental to the slim design of the LCD device. In addition, the additional part of the heat dissipating bracket 104 will also increase the manufacturing cost. Secondly, the LED module 103 needs additional LED driving circuit 1032 and conductive wires to power it. This again increases the cost of the LCD device.

The purpose of the present invention is to provide a liquid crystal displaying device in which an internal space thereof can be effectively used and the material cost is lowered.

In order to resolve the issues encountered by the prior art, a liquid crystal display device is provided in accordance with the present invention. The liquid crystal display device comprises a waveguide, an optical film, a liquid crystal display panel, a backframe, a middle frame, a printed circuit board, a light source, a deflector, and a reflector. The waveguide having a light inlet surface and a light exiting surface adjacent to the light inlet surface. The waveguide further includes a bottom surface and a side surface adjacent to both the light exiting surface and light inlet surface. An optical film is deployed over the light exiting surface of the waveguide. A liquid crystal panel is arranged adjacent to the light exiting surface of the waveguide. The backframe includes a base plate and sidewall extends along a light emitting direction. The base plate is arranged adjacent to the bottom surface of the waveguide and is defined with an opening. The sidewall is arranged adjacent to the light inlet surface of the waveguide. The middle frame includes a supporting portion for carrying a liquid crystal display panel, and a positioning portion extends from an edge of the supporting portion extending and bending along a direction against toward the light emitting direction. A receiving space is defined between the positioning portion and the backframe. The printed circuit board is disposed on the side of waveguide which is opposite to the base plate of the backframe and is interconnected to the liquid crystal display panel via a flexible printed circuit so as to drive the liquid crystal display panel. The printed circuit board is arranged with a liquid crystal display driving module and light source driving module in a surface opposite to the base plate of the backframe. The light source extends through the opening and mounting on the printed circuit board in a position adjacent to the base plate of the backframe. The light source is arranged to the light inlet surface of the waveguide and projecting a light beam into the receiving space defined between the positioning portion and the backframe. The deflector is disposed within the receiving space so as to direct the light beam projected from the light source into the light inlet surface of the waveguide. The reflector is disposed between the bottom surface of the waveguide and the base plate of the backframe.

Wherein the light source is a LED tube having a front light emitting surface, a level of the light beam projected from the LED is lower than the bottom surface of the waveguide.

Wherein the deflector has a curvilinear configuration and is positioned in the supporting portion and the positioning portion of the middle frame and adjacent to a light inlet surface of the waveguide.

Wherein the light source is an LED tube having a side light emitting surface and partially extending through the opening and disposed within the receiving space, the side light emitting surface laces to the light inlet of the waveguide.

Wherein the deflector is a leveling device disposed on the supporting portion of the middle frame in an area adjacent to the light inlet surface of the waveguide.

Wherein the waveguide includes a first light inlet surface and a second light inlet surface adjacent to the first light inlet surface.

In order to resolve the issues encountered by the prior art, a liquid crystal display device is provided in accordance with the present invention. The liquid crystal display device comprises a waveguide, an optical film, a liquid crystal display panel, a backframe, a middle frame, a printed circuit board, a light source, and a reflector. The waveguide has a light inlet surface, and a light exiting surface adjacent to the light inlet surface. The waveguide further includes a bottom surface, and a side surface adjacent to both the light exiting surface and light inlet surface. The liquid crystal panel is arranged adjacent to the light exiting surface of the waveguide. A backframe includes a base plate and sidewall extending along a light emitting direction, the base plate being arranged adjacent to the bottom surface of the waveguide. The base plate is defined with an opening, and the sidewall is arranged adjacent to the light inlet surface of the waveguide. The middle frame includes a supporting portion for carrying a liquid crystal display panel, and a positioning portion extends from an edge of the supporting portion extending and bending along a direction against toward the light emitting direction. The receiving space is defined between the positioning portion and the backframe. The printed circuit board is disposed on the side of the waveguide which is opposite to the base plate of the backframe, and is interconnected to the liquid crystal display panel so as to drive the liquid crystal display panel. The light source extends through the opening and mounts on the printed circuit board in a position adjacent to the base plate of the backframe. The light source is arranged to the light inlet surface of the waveguide and projects a light beam into the receiving space defined between the positioning portion and the backframe. And the deflector is disposed within the receiving space so as to direct the light beam projected from the light source into the light inlet surface of the waveguide.

Wherein the light source is a LED tube having a front light emitting surface, a level of the light beam projected from the LED is lower than the bottom surface of the waveguide.

Wherein the deflector has a curvilinear configuration and is positioned in the supporting portion and the positioning portion of the middle frame and adjacent to a light inlet surface of the waveguide.

Wherein the light source is an LED tube having a side light emitting surface and partially extending through the opening and disposed within the receiving space, the side light emitting surface faces to the light inlet of the waveguide.

Wherein the deflector is a leveling device disposed on the supporting portion of the middle frame in an area adjacent to the light inlet surface of the waveguide.

Wherein the liquid crystal display device further includes a reflector disposed between the bottom surface of the waveguide and the base plate of the backframe.

Wherein the printed circuit board is provided with a liquid crystal display driving module and light source driving module in a surface opposite to the base plate of the backframe.

Wherein the printed circuit board is interconnected to the liquid crystal display panel via a flexible printed circuit.

Wherein the liquid crystal display device further comprises an optical film deployed over the light exiting surface of the waveguide Wherein the waveguide includes a first light inlet surface and a second light inlet surface adjacent to the first light inlet surface.

With the provision of the present invention, a deflector is arranged in the backframe which has through on a base plate thereof through which a light source is mounted onto a printed circuit board arranged in adjacent area. Accordingly, space within the liquid crystal display panel can be effectively used, while the material is also reduced.

The above described is merely a summary of the present invention, and detailed descriptions related to preferred embodiments will be given herebelow in a way any skilled in the art can implement the present invention based on the disclosure explaining other purposes, features and advantages. As a result, preferred embodiments will be given along with the following drawings.

DETAILED DESCRIPTION OF PREFERRED EMBODIMENTS

A detailed, concise, and thorough description will be given to the preferred embodiments made in accordance with the present invention along with the accompanied drawings. Apparently, there are merely some typical examples while is not the whole. Based on these disclosed embodiments, any skilled in the art can readily conclude with other preferable embodiments without departing the spirit of the present invention, while they should be covered by the scope of the accompanied claims.

Figure 1:
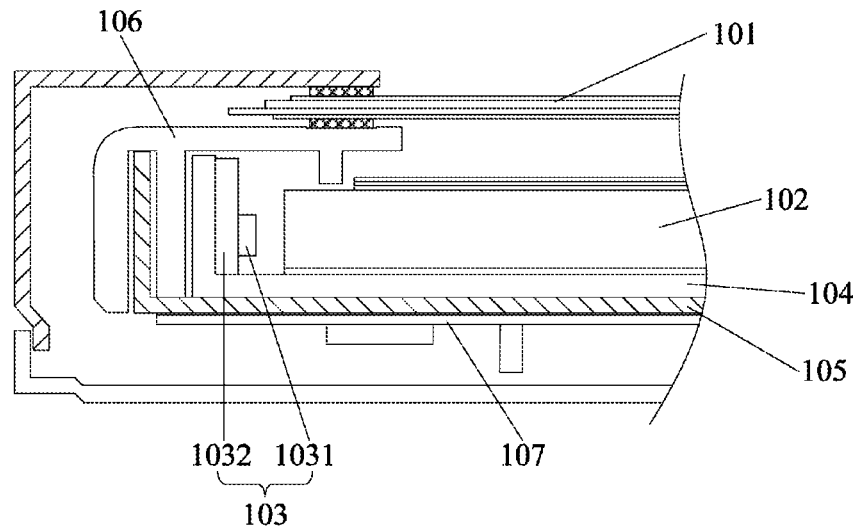
FIG. 1 is a partial cross sectional view of a prior art liquid crystal display device.
Figure 2:
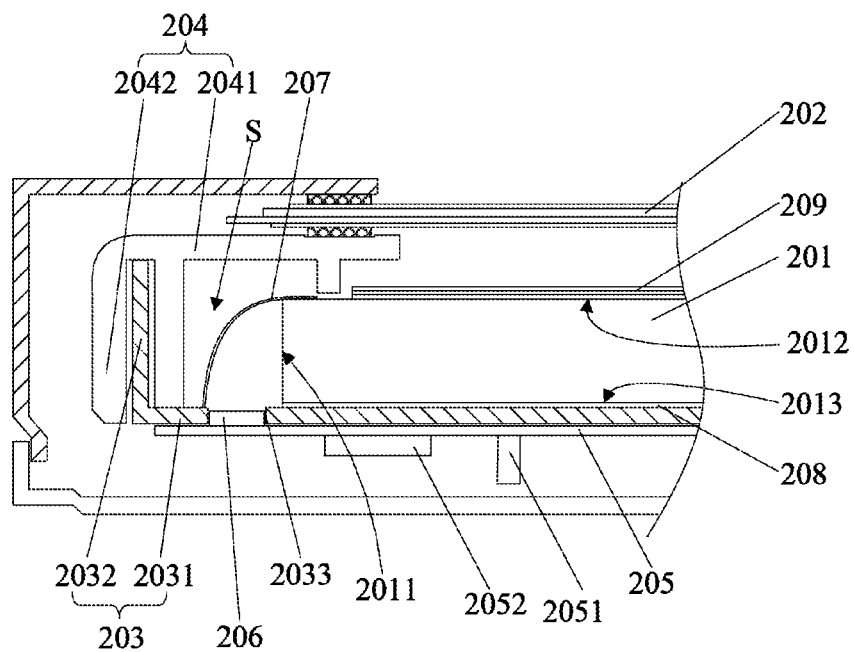
FIG. 2 is a partial cross sectional view of a liquid crystal display device made in accordance with a first embodiment of the present invention.

Referring to FIG. 2 in which a partial cross sectional view of a liquid crystal display device made in accordance with a first embodiment of the present invention is disclosed.

The liquid crystal display device includes a waveguide 201, a liquid crystal display panel 202, a backframe 203, a middle frame 204, a printed circuit board 205, a light source 206 and a deflector 207.

The waveguide 201 includes a light inlet surface 2011, a light exiting surface 2012 adjacent to the light inlet surface 2011. The waveguide 201 further includes a bottom surface 2013 opposite to the light exiting surface 2012, and a plurality of side surfaces which are adjacent to the light inlet surface 2011 and the light exiting surface 2012. The liquid crystal display panel 202 is arranged adjacent to the light exiting surface 2012 of the waveguide 201.

The backframe 203 includes a base plate 2031, and a sidewall 2032 extending along the light emitting direction along an edge of the base plate 2031. The base plate 2031 is arranged adjacent to the bottom surface 2013 of the waveguide 201. The base plate 2031 is defined with an opening 2033. The sidewall 2032 is arranged adjacent to the light inlet surface 2011 of the waveguide 201.

The middle frame 204 includes a supporting portion 2041 for supporting and carrying the liquid crystal display panel 202, and a positioning portion 2042 extending opposite the light emitting direction along an edge of the supporting portion 2041. The positioning portion 2042 and the backframe 203 jointly define a receiving space S which is corresponding to the opening 2033.

The printed circuit board 205 is arranged on the base plate 2031 of the backframe 203 in a position opposite to the side surface of the waveguide 201. The printed circuit board 205 is further interconnected to the liquid crystal display panel 202. In the preferred embodiment, the printed circuit board 205 is interconnected to the liquid crystal display panel 202 via a flexible printed circuit board (not shown in FIG. 2).

The light source 206 is mounted onto a surface of the printed circuit board 205 through the opening 2033 and is adjacent to the surface of the base plate 2031. The light source 201 is arranged adjacent to the light inlet surface 2011 of the waveguide 201. The light emitted from the light source 206 projects into the receiving space S. In the preferred embodiment of the present invention, the light source 206 is an LED tube with a front light emitting surface. A level of the light beam projected from the LED tube is lower than the bottom surface 2013 of the waveguide 201.

The deflector 207 is arranged within the receiving space S. A reflecting surface of the deflector 207 is arranged on the traveling path of the light beam projected from the light source 206. As a result, the light beam projected from the light source 206 is directed into the light inlet surface 2011 of the waveguide 201 in a way that the light beam enters into the waveguide 201. In this preferred embodiment, the deflector 207 has curvilinear configuration and is secured to the supporting portion 2042 and the positioning portion 2041 of the middle frame 204 and is adjacent to the light inlet surface 2011 of the waveguide 201

The liquid crystal display device further includes a reflector 208 and an optical film 209. The reflector 209 is disposed between the bottom surface 2013 of the waveguide 201 and the base plate 2031 of the backframe 203. The optical film 209 is deployed over the light exiting surface 2012 of the waveguide 201. By the provision of the reflector 208, the light beam emits from the bottom surface 2013 of the waveguide 201 can be redirected into the waveguide 201 such that the efficiency of the light utilization is enhanced. The optical film 209 is configured by a plurality of optical films, such a diffuser and prism so as to upgrade the optical quality.

In this embodiment, the printed circuit board 205 is arranged in a way which is back to back to the base plate 2031 of the backframe 203. The printed circuit board 205 is provided with a liquid crystal display driving module 2051 and light source driving module 2052 in a way that the printed circuit board 205 is integrated with functions of driving both the liquid crystal display panel 202 and the light source 206. In addition, except the light source 206 which is mounted on the printed circuit board 205, other devices are all arranged on a surface which is facing away the surface of the base plate 2031. In addition, the printed circuit board 205 can be used directly to power the light source 206, and heat dissipating. As a result, the printed circuit board 205 can be arranged closely to the base plate 2031 thereby achieving the goal of making a slim and compact configuration. The inner space is effectively utilized, while the heat built therein can be effectively dissipated. Furthermore, the printed circuit board 205 is incorporated with a flexible printed circuit which makes it readily flipped onto the base plate 2031. Accordingly, in case the light source 206 is going to be replaced, the printed circuit board 205 can be readily removed to make the replacement. This is really a convenient arrangement, while without contaminating those inner elements of the liquid crystal display device.

It should be noted that the waveguide 201 is incorporated with a single light inlet surface 2011. However, in other alternative embodiment, the waveguide 201 can be incorporated with a dual-light-inlet surfaces, i.e. a second light inlet surface is arranged on the opposite of the first light inlet surface 2011. A second set of light source 206, a backframe 203, a middle frame 204, a printed circuit board 205, and a deflector 207 can be also incorporated therewith to facilitate its intended purpose. Since their operation is similar, no detailed description is given.

Figure 3:
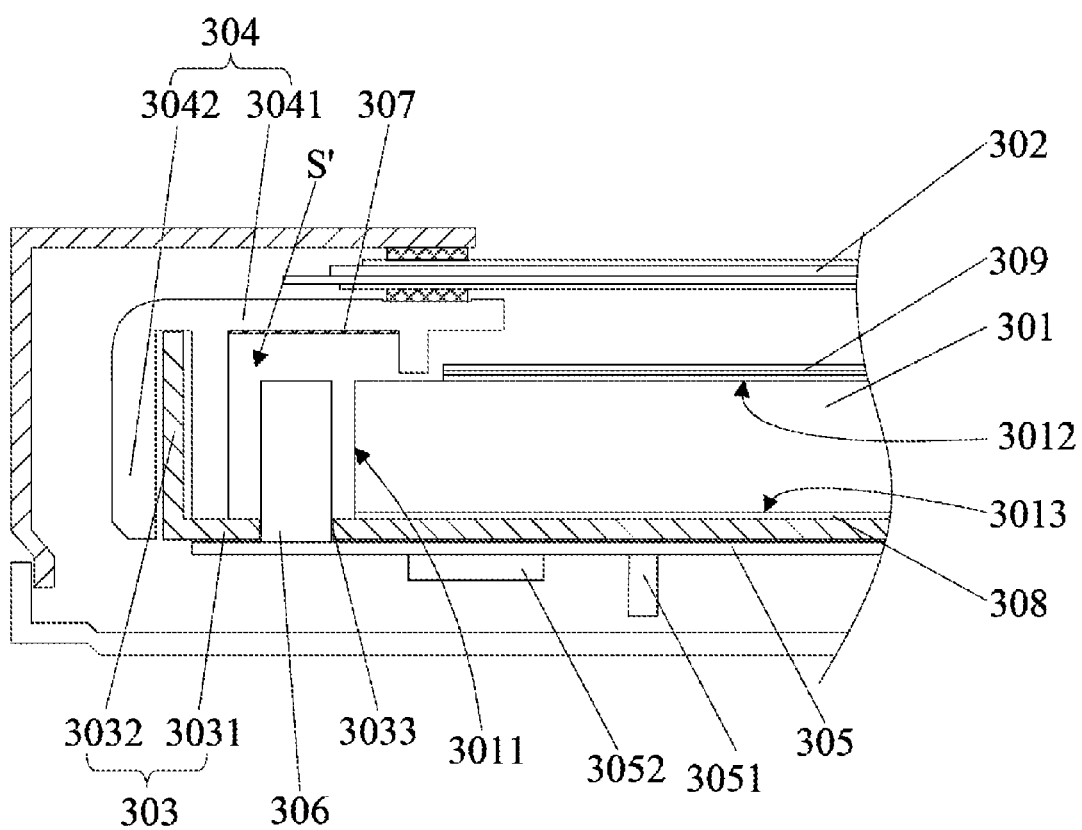
FIG. 3 is a partial cross sectional view of a liquid crystal display device made in accordance with a second embodiment of the present invention.

Referring to FIG. 3 in which a partial cross sectional view of a liquid crystal display device made in accordance with a second embodiment of the present invention is disclosed.

The liquid crystal display device includes a waveguide 301, a liquid crystal display panel 302, a backframe 303, a middle frame 304, a printed circuit board 305, a light source 306 and a deflector 207.

The waveguide 301 includes a light inlet surface 3011, a light exiting surface 3012 adjacent to the light inlet surface 3011. The waveguide 301 further includes a bottom surface 3013 opposite to the light exiting surface 3012, and a plurality of side surfaces which are adjacent to the light inlet surface 3011 and the light exiting surface 3012. The liquid crystal display panel 302 is arranged adjacent to the light exiting surface 3012 of the waveguide 301.

The backframe 303 includes a base plate 3031, and a sidewall 3032 extending along the light emitting direction along an edge of the base plate 3031. The base plate 3031 is arranged adjacent to the bottom surface 3013 of the waveguide 301. The base plate 3031 is defined with an opening 3033. The sidewall 3032 is arranged adjacent to the light inlet surface 3011 of the waveguide 301.

The middle frame 304 includes a supporting portion 3041 for supporting and carrying the liquid crystal display panel 302, and a positioning portion 3042 extending opposite the light emitting direction along an edge of the supporting portion 3041. The positioning portion 3042 and the backframe 303 jointly define a receiving space S' which is corresponding to the opening 3033.

The printed circuit board 305 is arranged on the base plate 3031 of the backframe 303 in a position opposite to the side surface of the waveguide 301. The printed circuit board 305 is further interconnected to the liquid crystal display panel 302. In the preferred embodiment, the printed circuit board 305 is interconnected to the liquid crystal display panel 302 via a flexible printed circuit board (not shown in FIG. 3).

The light source 306 is mounted onto a surface of the printed circuit board 305 through the opening 3033 and is adjacent to the surface of the base plate 3031. The light source 301 is arranged adjacent to the light inlet surface 3011 of the waveguide 301. The light emitted from the light source 306 projects into the receiving space S'. In the preferred embodiment of the present invention, the light source 306 is an LED tube with a side light emitting surface and portion of the LED tube passes through the opening 3033. The side light emitting surface of the LED tube is facing to the light inlet surface 3011 of the waveguide 301.

The deflector 207 is arranged within the receiving space S' to direct a light beam projected from the light source 306 into the light inlet surface 3011 of the waveguide 301 such that the light beam enters the waveguide 301. In this embodiment, the deflector 307 is a leveling device and is arranged on the supporting portion 3041 of the middle frame 304 and is adjacent to the light inlet surface 3011 of the waveguide 301. As a result, the light beam leaked and without entering the waveguide 301 can be effectively redirected into the waveguide 301 so as to increase the efficiency of the utilization of the light source.

The liquid crystal display device further includes a reflector 308 and an optical film 309. The reflector 309 is disposed between the bottom surface 3013 of the waveguide 301 and the base plate 3031 of the backframe 303. The optical film 309 is deployed over the light exiting surface 3012 of the waveguide 301. By the provision of the reflector 308, the light beam emits from the bottom surface 3013 of the waveguide 301 can be redirected into the waveguide 301 such that the efficiency of the light utilization is enhanced. The optical film 309 is configured by a plurality of optical films, such a diffuser and prism so as to upgrade the optical quality.

In this embodiment, the printed circuit board 305 is arranged in a way which is back to back to the base plate 3031 or the backframe 303. The printed circuit board 305 is provided with a liquid crystal display driving module 3051 and light source driving module 3052 in a way that the printed circuit board 305 is integrated with functions of driving both the liquid crystal display panel 302 and the light source 306. In addition, except the light source 306 which is mounted on the printed circuit board 305, other devices are all arranged on a surface which is facing away the surface of the base plate 3031. In addition, the printed circuit board 305 can be used directly to power the light source 306, and heat dissipating. As a result, the printed circuit board 305 can be arranged closely to the base plate 3031 thereby achieving the goal of making a slim and compact configuration. The inner space is effectively utilized, while the heat built therein can be effectively dissipated. Furthermore, the printed circuit board 305 is incorporated with a flexible printed circuit which makes it readily flipped onto the base plate 3031. Accordingly, in case the light source 306 is going to be replaced, the printed circuit board 305 can be readily removed to make the replacement. This is really a convenient arrangement, while without contaminating those inner elements of the liquid crystal display device.

It should be noted that the waveguide 301 is incorporated with a single light inlet surface 3011. However, in other alternative embodiment, the waveguide 301 can be incorporated with a dual-light-inlet surfaces, i.e. a second light inlet surface is arranged on the opposite of the first light inlet surface 3011. A second set of light source 306, a backframe 303, a middle frame 304, a printed circuit board 305, and a deflector 307 can be also incorporated therewith to facilitate its intended purpose. Since their operation is similar, no detailed description is given.

With the provision of the present invention, a deflector is arranged in the backframe which has through on a base plate thereof through which a light source is mounted onto a printed circuit board arranged in adjacent area. Accordingly, space within the liquid crystal display panel can be effectively used, while the material is also reduced.

The above described is merely preferred embodiment of the present invention, and it is merely for illustration while not for limitation. As a result, any alternation and modification or any equivalents based on the specification as well as the drawings will be covered by the attached claims even they are applied to other fields of technology directly or indirectly.

The invention claimed is:

1. A liquid crystal display device, comprising:
   a waveguide having a light inlet surface, and a light exiting surface adjacent to the light inlet surface, the waveguide further including a bottom surface, and a side surface adjacent to both the light exiting surface and light inlet surface;
   an optical film deployed over the light exiting surface of the waveguide;
   a liquid crystal panel arranged adjacent to the light exiting surface of the waveguide;
   a backframe including a base plate and sidewall extending along a light emitting direction, the base plate being arranged adjacent to the bottom surface of the waveguide, the base plate being defined with an opening, and the sidewall being arranged adjacent to the light inlet surface of the waveguide;
   a middle frame including a supporting portion for carrying the liquid crystal display panel, and a positioning portion extending from an edge of the supporting portion extending and bending along a direction against toward the light emitting direction, a receiving space being defined between the positioning portion and the backframe;
   a printed circuit board disposed on the side of the waveguide which is opposite to the base plate of the backframe, and being interconnected to the liquid crystal display panel via a flexible printed circuit so as to drive the liquid crystal display panel, the printed circuit board being arranged with a liquid crystal display driving module and light source driving module in a surface opposite to the base plate of the backframe;
   a light source extending through the opening and mounted on the printed circuit board in a position adjacent to the base plate of the backframe, the light source being arranged onto the light inlet surface of the waveguide and projecting a light beam into the receiving space defined between the positioning portion and the backframe;
   a deflector disposed within the receiving space so as to direct the light beam projected from the light source into the light inlet surface of the waveguide; and
   a reflector disposed between the bottom surface of the waveguide and the base plate of the backframe.

2. The liquid crystal display device as recited in claim 1, wherein the light source is a LED tube having a front light emitting surface, a level of the light beam projected from the LED is lower than the bottom surface of the waveguide.

3. The liquid crystal display device as recited in claim 2, wherein the deflector has a curvilinear configuration and is positioned in the supporting portion and the positioning portion of the middle frame and adjacent to a light inlet surface of the waveguide.

4. The liquid crystal display device as recited in claim 1, wherein the light source is an LED tube having a side light emitting surface and partially extending through the opening and disposed within the receiving space, the side light emitting surface faces to the light inlet of the waveguide.

5. The liquid crystal display device as recited in claim 4, wherein the deflector is a leveling device disposed on the supporting portion of the middle frame in an area adjacent to the light inlet surface of the waveguide.

6. The liquid crystal display device as recited in claim 1, wherein the waveguide includes a first light inlet surface and a second light inlet surface adjacent to the first light inlet surface.

7. A liquid crystal display device, comprising:
   a waveguide having a light inlet surface, and a light exiting surface adjacent to the light inlet surface, the waveguide further including a bottom surface, and a side surface adjacent to both the light exiting surface and light inlet surface;
   a liquid crystal panel arranged adjacent to the light exiting surface of the waveguide;
   a backframe including a base plate and sidewall extending along a light emitting direction, the base plate being arranged adjacent to the bottom surface of the waveguide, the base plate being defined with an opening, and the sidewall being arranged adjacent to the light inlet surface of the waveguide;
   a middle frame including a supporting portion for carrying the liquid crystal display panel, and a positioning portion extending from an edge of the supporting portion extending and bending along a direction against toward the light emitting direction, a receiving space being defined between the positioning portion and the backframe;
   a printed circuit board disposed on the side of the waveguide which is opposite to the base plate of the backframe, and being interconnected to the liquid crystal display panel so as to drive the liquid crystal display panel;
   a light source extending through the opening and mounted on the printed circuit board in a position adjacent to the base plate of the backframe, the light source being arranged onto the light inlet surface of the waveguide and projecting a light beam into the receiving space defined between the positioning portion and the backframe; and
   a deflector disposed within the receiving space so as to direct the light beam projected from the light source into the light inlet surface of the waveguide.

8. The liquid crystal display device as recited in claim 1, wherein the light source is a LED tube having a front light emitting surface, a level of the light beam projected from the LED is lower than the bottom surface of the waveguide.

9. The liquid crystal display device as recited in claim 8, wherein the deflector has a curvilinear configuration and is positioned in the supporting portion and the positioning portion of the middle frame and adjacent to a light inlet surface of the waveguide.

10. The liquid crystal display device as recited in claim 7, wherein the light source is an LED tube having a side light emitting surface and partially extending through the opening and disposed within the receiving space, the side light emitting surface faces to the light inlet of the waveguide.

11. The liquid crystal display device as recited in claim 10, wherein the deflector is a leveling device disposed on the supporting portion of the middle frame in an area adjacent to the light inlet surface of the waveguide.

12. The liquid crystal display device as recited in claim 7, wherein the liquid crystal display device further includes a reflector disposed between the bottom surface of the waveguide and the base plate of the backframe.

13. The liquid crystal display device as recited in claim 7, wherein the printed circuit board is provided with a liquid crystal display driving module and light source driving module in a surface opposite to the base plate of the backframe.

14. The liquid crystal display device as recited in claim 7, wherein the printed circuit board is interconnected to the liquid crystal display panel via a flexible printed circuit.

15. The liquid crystal display device as recited in claim 7, further comprising an optical film deployed over the light exiting surface of the waveguide.

16. The liquid crystal display device as recited in claim 7, wherein the waveguide includes a first light inlet surface and a second light inlet surface adjacent to the first light inlet surface.

* * * * *